US005355732A

United States Patent [19]

Anderl et al.

[11] Patent Number: 5,355,732

[45] Date of Patent: Oct. 18, 1994

[54] VIBRATING TABLE WITH DRIVEN UNBALANCED SHAFTS

[75] Inventors: Manfred Anderl, Burbach; Gerhard Bogun, Herdorf; Winfried Burkhard, Wenden-Hünsborn, all of Fed. Rep. of Germany

[73] Assignee: Hess Maschinenfabrik GmbH & Co. KG, Burbach-Wahlbach, Fed. Rep. of Germany

[21] Appl. No.: 960,392

[22] Filed: Jan. 14, 1993

[30] Foreign Application Priority Data

May 22, 1991 [DE] Fed. Rep. of Germany ....... 4116647

[51] Int. Cl.[5] ............................................ G01M 7/06

[52] U.S. Cl. ....................................... 73/672; 73/667; 73/663

[58] Field of Search ................. 73/662, 663, 664, 667, 73/672

[56] References Cited

U.S. PATENT DOCUMENTS

| | | | |
|---|---|---|---|
| 3,918,298 | 11/1975 | Petersen et al. | 73/664 |
| 5,005,439 | 4/1991 | Jensen et al. | 73/667 |

FOREIGN PATENT DOCUMENTS

| | | | |
|---|---|---|---|
| 1283571 | 1/1987 | U.S.S.R. | 73/663 |
| 1610360 | 11/1990 | U.S.S.R. | 73/664 |
| 2128289 | 4/1984 | United Kingdom | 73/672 |

OTHER PUBLICATIONS

"A New Dynamic Control 4–Moment Vibration Generator" by S. Hayashi, M. Nakamura, F. Shôji, T. Ichioka; Meiden Review, Series No. 63, 1981, No. 3, pp. 32–36.

*Primary Examiner*—Hezron E. Williams
*Assistant Examiner*—Rose M. Finley
*Attorney, Agent, or Firm*—Spencer, Frank & Schneider

[57] ABSTRACT

A vibrator includes a vibrating table; a plurality of driven unbalanced shafts disposed within the vibrating table and arranged in pairs; and a plurality of unbalanced bodies. A separate unbalanced body is connected to each unbalanced shaft. The unbalanced bodies can assume various vibrating frequencies and angular positions. An adjustment device varies the vibrating frequencies and angular positions of the unbalanced bodies relative to one another. Each shaft is driven by a separate motor; the motors are adapted to rotate in synchronism with one another at a predetermined rotational speed. The adjustment device includes an electronic controller for regulating each of the motors. The electronic controller includes an arrangement for changing the vibrating frequencies of the unbalanced bodies by briefly varying a rotational speed of the unbalanced shafts; and an arrangement for changing the angular positions of the unbalanced bodies relative to one another by briefly varying a rotational speed of at least one driven unbalanced shaft of a pair of driven unbalanced shafts.

7 Claims, 4 Drawing Sheets

VIBRATING TABLE WITH DRIVEN UNBALANCED SHAFTS

BACKGROUND OF THE INVENTION

The invention relates to a vibrator including a vibrating table with driven unbalanced shafts being disposed in the vibrating table and each being equipped with an unbalanced body. The unbalanced shafts are associated with one another in pairs and are provided with an adjustment device by means of which the vibrating frequency and the angular position of the unbalanced bodies relative to one another can be changed.

An adjustable and controllable vibrator of the mentioned type serves the purpose of optimally compacting concrete elements during their production. This is accomplished by program controlled adaptation of the operating parameters of the vibrator to the product specific requirements during the production process.

The following solutions are provided in the art for a program control: a mechanical adjustment of an unbalanced mass from the zero position up to a maximum value is effected in connection with external or counter-revolving vibrators in that transversely movable toothed clamps are disposed on the unbalanced shafts which are connected by way of a push rod equipped with oblique teeth with an adjustment device disposed outside of the vibrator (German Periodical "Betonwerk+Fertigteil-Technik" [Concrete Manufacture+-Finished Component Technology] No. 10/1988, pages 48–50). Phase adjustment is possible by means of an electromechanically adjustable overriding drive (DE 3,708,922.A1); or by means of a phase adjustment drive (DE 3,709,112.C1).

SUMMARY OF THE INVENTION

The invention is based on the following considerations: The compacting of concrete elements is effected in an optimum manner by means of a vibrator if the following adjustment and control problems are solved:

(a) changing the vibrator frequency by changing the number of revolutions Of the vibrator shaft;

(b) changing the vibrating force between zero and a maximum by adjustment of the phase of at least two rotating unbalanced masses relative to one another;

(c) changing the vibration amplitude by combining the measures mentioned under (a) and (b) above.

Accordingly, it is the object of the invention to perform, in a vibrator of the above-mentioned type, the adaptation of the operating parameters required to generate the optimum vibration effect according to a new principle. According to the invention, this is accomplished in that each unbalanced shaft is individually driven by a motor which rotates at a predetermined number of revolutions in synchronism with the other motors. An electronic controller is provided as the adjustment device by means of which each motor can be regulated in angular synchronism so that a change in the vibration frequency is effected by a change in the number of revolutions of the unbalanced shafts, and a change in the angular position of the unbalanced bodies relative to one another is effected by a change in the number of revolutions of at least one of the two paired unbalanced shafts for a short period of time.

In the invention the individual unbalanced shafts are synchronized by an electronic, angularly synchronous control of the unbalance drives. The intensity of the vibrating effect is controlled by an electronic change of the angle of the rotor positions of the individual unbalance drives relative to one another. Features and modifications of the invention are defined in the dependent claims.

BRIEF DESCRIPTION OF THE DRAWINGS

One embodiment of the invention is illustrated in the drawing and will now be described in detail. The drawing figures are illustrations employing circuit symbols in which.

DETAILED DESCRIPTION OF THE PREFERRED EMBODIMENTS

Figure 1:
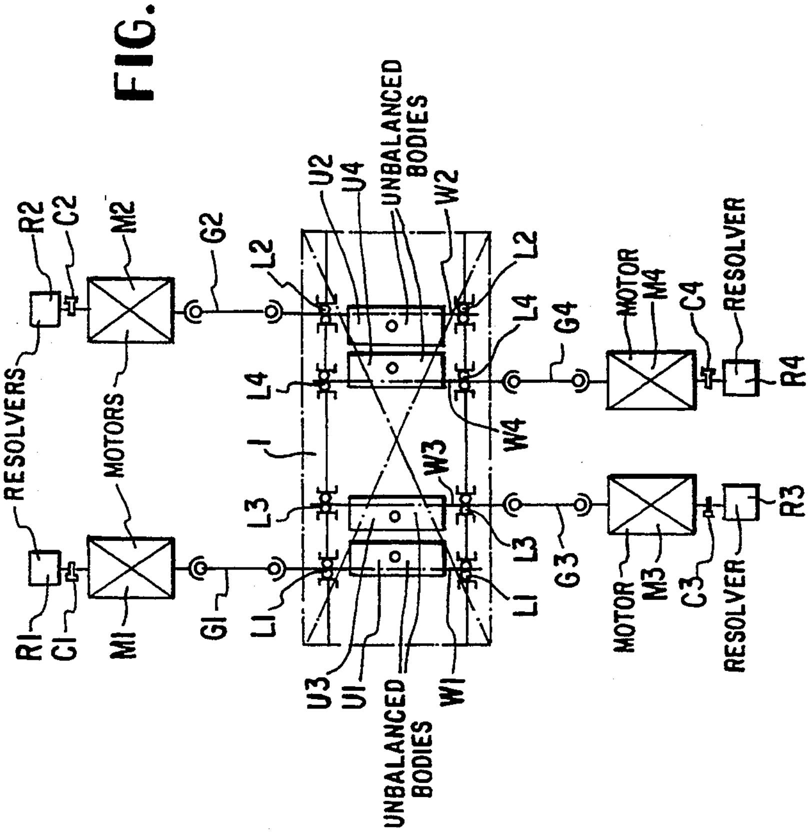
FIG. 1 depicts a vibrating table equipped with four unbalanced shafts and an individual drive for each shaft.
Figure 1A:
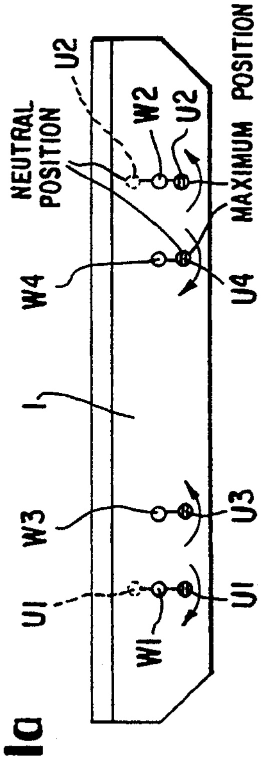
FIG. 1*a* depicts a schematic side elevational view of the vibrating table of FIG. 1.
Figure 2:
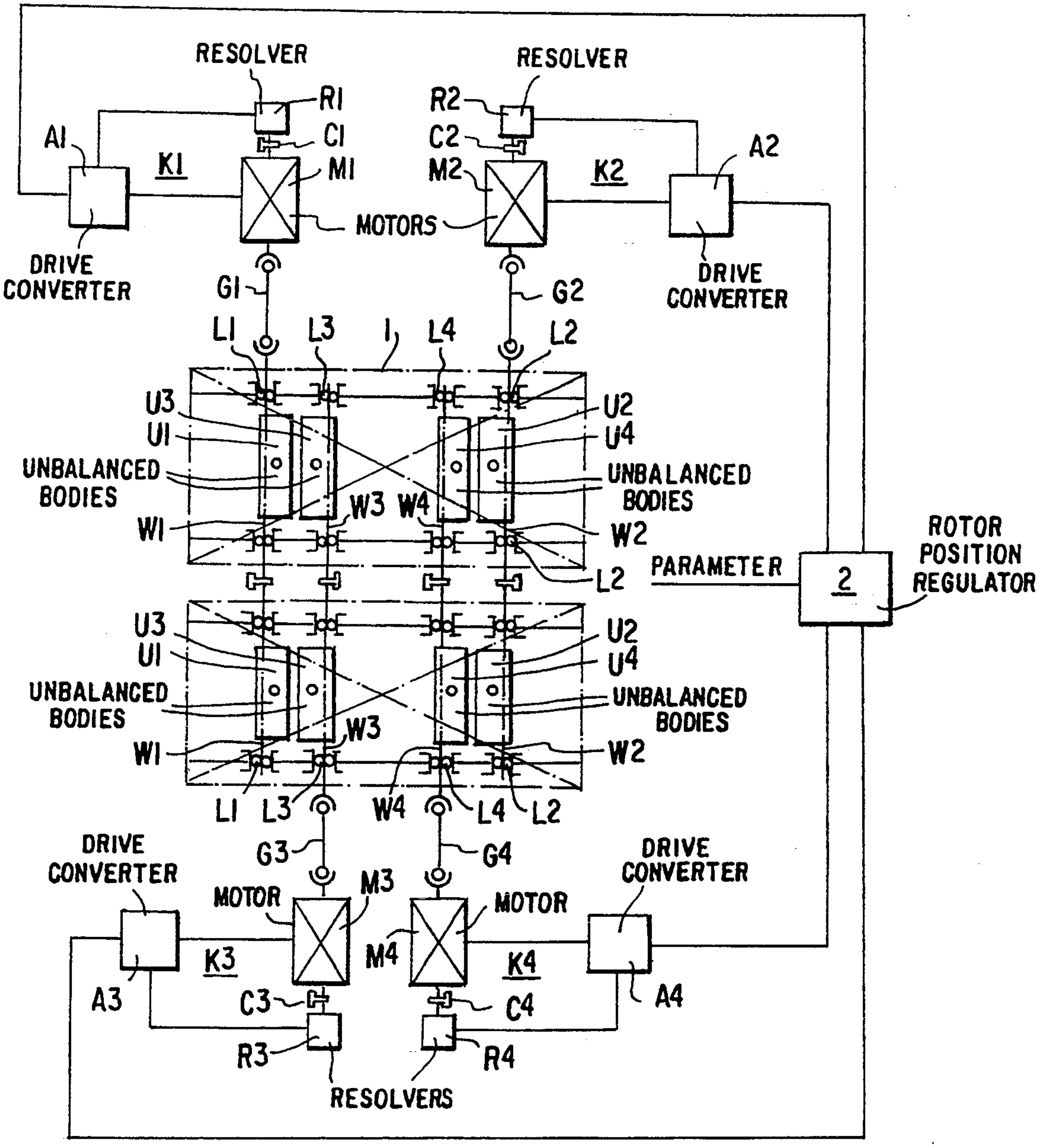
FIG. 2 depicts a two-part vibrating table equipped with eight unbalanced shafts, with pairs of shafts being coupled together, and with individual drives for each shaft, with the control circuit for the individual drives also being shown.

Four unbalanced shafts W1 to W4 disposed in a vibrating table 1 are individually driven by associated motors M1 to M4 by way of articulated shafts G1 to G4 as shown in FIGS. 1 and 1*a*. Unbalanced shafts W1 to W4 are supported by means of roller bearings L1 to L4 in vibrating table 1. By way of a coupling C1 to C4, a resolver R1 to R4 is mechanically connected with each motor M1 to M4. Couplings are also provided between the shafts of the two-part vibrating table 1 of FIG. 2. Each motor M1 to M4 and each resolver R1 to R4 is electrically connected with a drive converter A1 to A4 which is a component of a motor control circuit K1 to K4. A rotor position controller 2 ranks higher than the motor control circuits K1 to K4.

Figure 3:
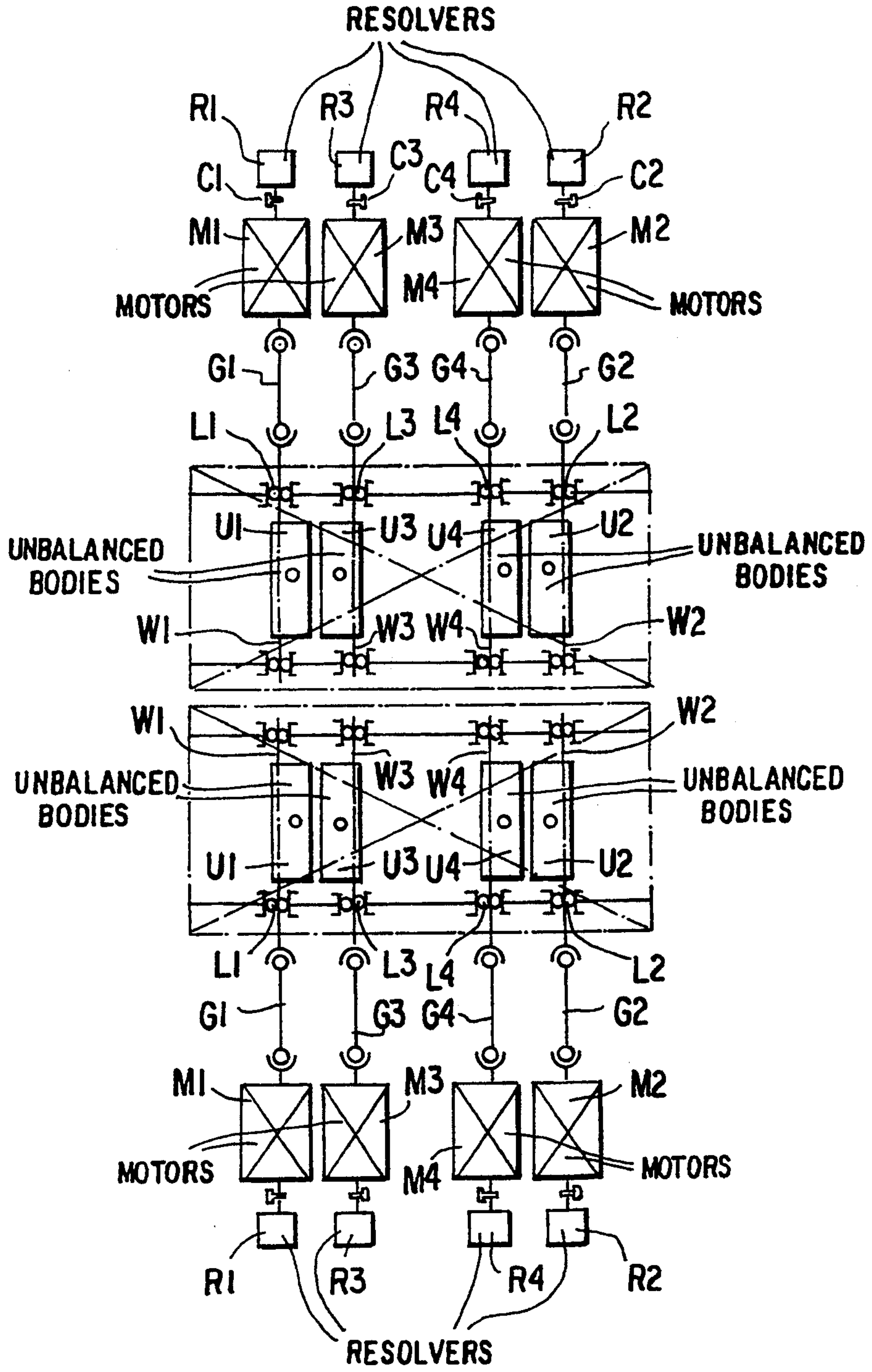
FIG. 3 depicts a two-part vibrating table equipped with eight unbalanced shafts and individual drives for each shaft.
Figure 4:
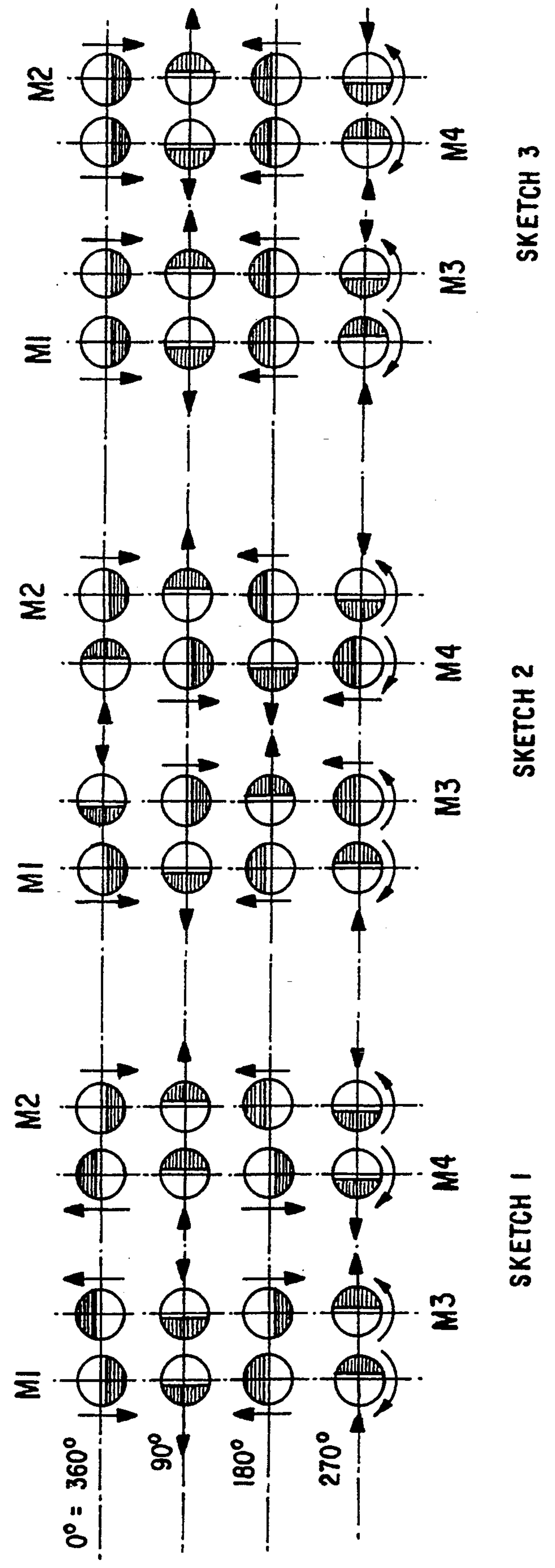
FIG. 4 depicts the operation of the phase adjustment of the unbalanced masses.

All four motors M1 to M4 rotate constantly in absolute synchronism at a predetermined number of revolutions. Unbalanced bodies U1 to U4 fastened to the shafts are arranged relative to one another in such a way that their centrifugal forces cancel one another out and no vibratory effect exists—FIG. 4, sketch 1. If vibration is to take place, the phase of unbalanced bodies U1 to U4 must be adjusted to a value that corresponds to the desired vibratory effect. This is done in such a way that motors M3 and M4 are briefly caused to rotate at a reduced speed relative to motors M1 and M2 but in synchronism with ode another until the desired phase adjustment has been realized—FIG. 4, e.g. 100% in sketch 3 and 70% in sketch 2—to then immediately rotate again at the same speed as motors M1 and M2 so that the set position of unbalanced bodies U1 to U4 remains in effect for the duration of the vibration process. Resetting to the zero position takes place in the same, but reversed manner. The arrangement shown in FIG. 3 permits the simultaneous operation of both halves of the vibrating table at different frequencies and vibration forces.

Each unbalanced shaft W1 to W4 is individually driven by one of the motors M1 to M4. Each one of motors M1 to M4 rotates at a predetermined speed in synchronism with the other motors. An electronic controller it provided as the adjustment device by means of which the vibration frequency and the angular position of unbalanced bodies U1 to U4 relative to one another can be changed. By way of the electronic controller, each motor M1 to M4 can be regulated in angular synchronism in such a way that a change in the vibration frequency is brought about by a brief change of the number of revolutions of unbalanced shafts W1 to W4 and a change in the angular position of unbalanced bodies U1 to U4 relative to one another is accomplished by a brief change in the number of revolutions of at least one of the two paired unbalanced shafts W1 to W4.

Unbalanced bodies U1 to U4 of associated unbalanced shafts W1 to W4 have an angular position of 180° relative to one another. By way of one of the motors M1 to M4 driving a pair of unbalanced shafts W1 to W4, the one unbalanced shaft is briefly driven at a reduced speed. Once the desired new angular position different from 180° is reached, the shaft is driven again at the same number of revolutions as the motor driving the associated unbalanced shaft.

Figure 5:
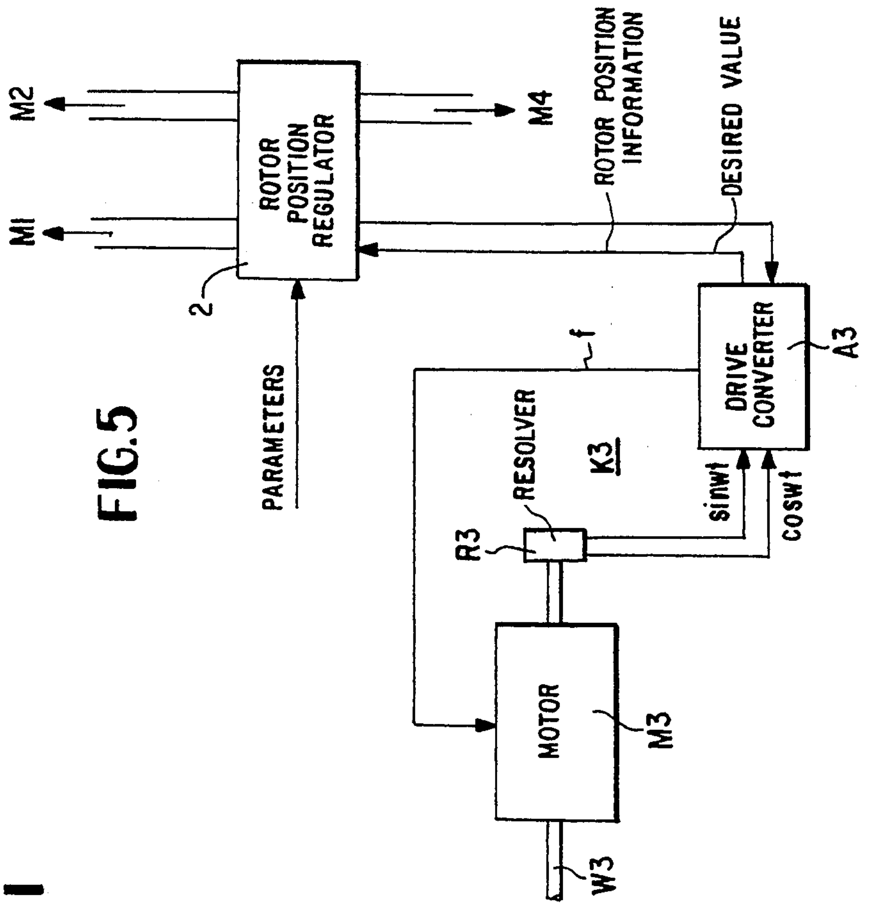
FIG. 5 is a sectional view of FIG. 2, depicting the control circuit for one of the individual drives and indicating the flow of the signals.

Motors M1 to M4 are regulated by way of motor control circuits K1 to K4 and rotor position regulator 2. The rotor position control ranks higher than motor Control circuits K1 to K4. Each motor M1 to M4 has an associated mechanically coupled resolver R1 to R4 and, as a component of one of the motor control circuits K1 to K4, an associated one of drive converters A1 to A4. Drive converters A1 to A4 change the number of revolutions of Motors M1 to M4 as a function of output signals sin ωt and cos ωt from resolvers R1 to R4 and desired value signals from rotor position controller 2 by way of the operating frequency f, as shown in FIG. 5. Rotor position controller 2 receives actual values for the rotor positions of motors M1 to M4 and operating parameters from motor Control circuits K1 to K4. The operating parameters include, for example, desired angle, duration of vibration and adjustment time.

One of the motors M1 is intended as a guiding drive, the remaining motors M2 to M4 are intended as follower drives. A fixed desired value input selected in dependence on the selected number of revolutions is provided for the guiding drive, and the desired value for the follower drives is calculated by way of a PI position algorithm from their deviation from the desired position. The PI adjustment algorithm reads as follows:

$$Yn = \left[ X_{dn} + \frac{T_A}{T_N} \sum_{i=1}^{n} X_{di} + \frac{T_V}{T_A} (X_{dn} - X_{dn-1}) \right] \cdot K_p$$

where $Y_n$=adjustment value for cycle n
$X_{dn}$=control difference in cycle n
$X_{dn-1}$=control difference in cycle n−1
$T_A$=sampling time
$T_N$=adjustment time
$T_V$=lead time
$K_P$=proportional constant

Commercial Utility

The invention is commercially usable in the production of concrete elements which are compacted.

We claim:

1. In a vibrator including:
(a) a vibrating table;
(b) a plurality of driven unbalanced shafts disposed within said vibrating table and arranged in pairs;
(c) a plurality of unbalanced bodies; a separate unbalanced body being connected to each unbalanced shaft; the unbalanced bodies being adapted to assume various vibrating frequencies and angular positions; and
(d) an adjustment means for varying the vibrating frequencies and angular positions of said unbalanced bodies relative to one another;
the improvement comprising
a plurality of motors; a separate motor being drivingly connected to each said driven unbalanced shaft; said motors being adapted to rotate in synchronism with one another at a predetermined rotational speed;
further wherein said adjustment means includes an electronic controller for regulating each of said motors, said electronic controller comprising:
means for changing the vibrating frequencies of said unbalanced bodies by briefly varying a rotational speed of said unbalanced shafts; and
means for changing the angular positions of said unbalanced bodies relative to one another by briefly varying a rotational speed of at least one driven unbalanced shaft of a pair of driven unbalanced shafts.

2. The vibrator according to claim 1 wherein the unbalanced shafts are four in number.

3. A vibrator according to claim 1, wherein said electronic controller comprises:
(a) motor control circuits, each of said motor control circuits regulating a rotational speed of a corresponding one of said motors; and
(b) a rotor position controller superordinated to said motor control circuits, said rotor position controller regulating rotational speeds of said motors relative to one another by generating desired value signals for said rotational speeds.

4. A vibrator according to claim 3, wherein each of said motor control circuits comprises:
(a) a mechanically coupled resolver for detecting the rotational speed of an associated motor and for generating output signals corresponding to said rotational speed; and
(b) a drive converter for changing the rotational speed of said corresponding motor as a function of the output signals from said resolver and as a function of desired value signals from said rotor position controller.

5. A vibrator according to claim 4, further comprising means for applying to said rotor position controller actual values for rotor positions of said motors and operating parameters from said motor control circuits.

6. A vibrator according to claim 1 wherein one of said motors is a guiding drive, and a remainder of said motors are follower drives.

7. A vibrator according to claim 6, further comprising means for driving said guiding drive at a fixed desired value, said fixed desired value being a function of a given selected number of revolutions, and means for driving said follower drives at desired values calculated by way of a PI adjustment algorithm from their deviation from the desired position.

* * * * *